(12) United States Patent
Iwao et al.

(10) Patent No.: US 6,238,779 B1
(45) Date of Patent: May 29, 2001

(54) LAMINATED ELECTRIC PART

(75) Inventors: Hidemi Iwao; Toshifumi Kawata, both of Tokyo (JP)

(73) Assignee: Taiyo Yuden Co., Ltd, Tokyo (JP)

( * ) Notice: Subject to any disclaimer, the term of this patent is extended or adjusted under 35 U.S.C. 154(b) by 0 days.

(21) Appl. No.: 09/422,496

(22) Filed: Oct. 21, 1999

(30) Foreign Application Priority Data

Oct. 22, 1998 (JP) ................................................. 10-301399
Sep. 1, 1999 (JP) ................................................. 11-246979

(51) Int. Cl.[7] ............................... B32B 3/00; H05K 1/11
(52) U.S. Cl. ......................... 428/210; 361/792; 361/795; 361/299.2; 361/803; 174/261; 174/262
(58) Field of Search ............................ 257/531; 361/792, 361/795, 803, 299.2; 428/210; 174/261, 262

(56) References Cited

U.S. PATENT DOCUMENTS 4,724,283 * 2/1988 Shimada et al. ..................... 174/68.5
5,917,388 * 6/1999 Tronche et al. ....................... 333/246
5,977,850 * 11/1999 Chaturvedi ........................... 333/238

OTHER PUBLICATIONS

Patent Abstract of Japan: I. Hidemi: "Laminated Electronic Part and Its Manufacture", Publ. No. 08055726, Date of Publ.: Feb. 27, 1996.
Patent Abstract of Japan: U. Kazuyoshi et als: "Laminated Type Inductor", Publ. No. 09129447, Date of Publ.: May 16, 1997.

* cited by examiner

Primary Examiner—Cathy Lam
(74) Attorney, Agent, or Firm—Rosenman & Colin LLF

(57) ABSTRACT

A multilayer type electronic part includes a laminated structure formed by stacking a plurality of first and second ceramic layers, the first ceramic layers being provided with internal electrode patterns on top thereof, the second ceramic layers having no internal electrode pattern and being located at a top and a bottom portions of the laminated structure, respectively, the internal electrode patterns being connected to each other to form a coil inside the laminated structure, a pair of external electrodes provided at two opposing sides of the laminated structure and connected to the coil. The multilayer type electronic part further includes one or more third ceramic layers, each of the third ceramic layers not including internal electrode pattern and being interposed between the first ceramic layers, and means for connecting the internal electrode patterns formed on the first ceramic layers to form the coil.

13 Claims, 11 Drawing Sheets

(A)

(B)

(C)

(D)

(A)

(B)

(A)

(B)

(C)

(D)

LAMINATED ELECTRIC PART

FIELD OF THE INVENTION

The present invention relates to multilayer type electronic parts (or laminated electric parts), e.g., inductor; and, more particularly, to multilayer type electronic parts formed using identical ceramic layer sheets having different inductance values from each other.

BACKGROUND OF THE INVENTION

A multilayer type electronic part is manufactured by using either a wet stacking method or a dry stacking method. In the wet stacking method, the multilayer type electronic part is formed by repeatedly coating a ceramic paste and a conductive paste using a screen printing so as to obtain alternating ceramic layers and internal electrode patterns. In the dry stacking method, the multilayer type electronic part is formed by first forming ceramic green sheets, printing the internal electrode patterns on the ceramic green sheets using the conductive paste and screen printing, and then laminating the ceramic green sheets.

In the multilayer type ceramic inductor or the multilayer type composite part incorporating therein an inductor manufactured using the wet stacking method, the internal electrode patterns formed on the ceramic layers are subsequently electrically connected to each other to form a coil thereinside by coating the ceramic paste on each of the internal electrode patterns except for ends thereof and then coating the conductive paste on the ends.

In the multilayer type ceramic inductor or the multilayer type composite part incorporating therein an inductor manufactured using the dry stacking method, the internal electrode patterns formed on the ceramic green sheets are subsequently electrically connected to each other to form a coil thereinside by filling through-holes on the ceramic green sheets with a conductive material.

The laminated structure formed using either of the methods described above is diced and then is sintered. There is applied on the diced sintered laminated structure a conductive paste on two opposing sides thereof. The diced sintered laminated structure is then heated to allow the conductive paste to stick thereonto, forming external electrodes, resulting in the multilayer type electronic part.

The multilayer type electronic part manufactured in the manners described above, for example, a multilayer type ceramic inductor, is formed with the internal electrode patterns, the internal electrode patterns being stacked on top of another a direction identical to the direction in which the sheets constituting the laminated structure are stacked, resulting in the internal electrode patterns forming the coil. Both ends of the coiled internal electrode patterns function as the lead electrodes by being exposed at the above-mentioned opposing sides of the laminated structure, allowing them to be electrically connected to the external electrodes.

There is shown in FIG. 14 an exploded perspective view of the way in which the ceramic layers in the multilayer type ceramic inductor including a laminated structure 11 are stacked using the dry stacking method. As shown, the laminated structure 11 includes a plurality of stacked ceramic layers 1, 1 . . . , 1', 1' . . . .

The ceramic layers 1, 1 . . . , made of a magnetic material, are respectively formed with internal electrode patterns 5a–5d. The internal electrode patterns 5a–5d are subsequently electrically connected to each other by filling through-holes 6, 6 . . . with a conductive material in such a way that they form a coil inside the laminated structure 11 by being stacked on top of each other in a direction identical to the direction in which the layers are stacked in the laminated structure 11. The ceramic layers 1, 1 . . . act as a magnetic core of the coil.

As shown in FIG. 14, the ceramic layers 1, 1 which are, respectively, located at bottom and at top of the laminated structure 11 are, respectively, formed with the internal electrode patterns 5c, 5d, wherein one of the ends of each of the internal electrode patterns 5c, 5d functions as the lead electrodes by being located opposing side from each other in the laminated structure 11 and being exposed.

Above the top ceramic layer 1 and below the bottom ceramic layer 1 are, respectively, disposed the ceramic layers 1', 1' . . . which are not formed with the internal electrode pattern. These ceramic layers are known as blank ceramic layers.

The laminated structure 11 further includes a pair of external electrodes (not shown) at the opposing sides thereof, the external electrodes being formed by applying a conductive paste, e.g., silver paste, on the foregoing opposing sides and heating the laminated structure 11 to force the conductive paste to stick thereon. In this case, if desired, a nickel coating or a solder coating may be additionally applied thereon. The external electrodes are electrically connected to the lead electrodes 4, 4.

In addition, the multilayer type composite electronic part may include, for example, a multilayer type LC part incorporating therein an inductance portion as well as a capacitor portion.

In such multilayer type electronic parts, the inductance can be varied by changing the number of turns in the coil or by changing the permeability of the magnetic material. However, in changing the inductance using the former method, since the external dimensions of the multilayer type electronic parts are usually fixed, the number of turns in the coil can be changed either by increasing the thickness of the ceramic layers or by reducing the number of the ceramic layers 1, 1 . . . having the internal electrode patterns 5a–5d and increasing the ceramic layers without the internal electrode pattern printed thereon.

In order to increase the production efficiency in manufacturing the multilayer type electronic parts, it is desirable to standardize the ceramic green sheets for forming the laminated structure and use the standardized ceramic green sheets to manufacture the multilayer type electronic parts having different inductance values from each other. Currently, however, the ceramic layers having different permeability from each other or the ceramic layers having different thickness from each other are used in manufacturing the multilayer type electronic parts different from each other in their performance characteristics, necessitating various types of ceramic green sheets to be prepared in advance, which, in turn, will reduce the production efficiency.

On the other hand, in using the ceramic green sheets used in manufacturing the multilayer type electronic parts with high inductance in manufacturing the multilayer type electronic parts having low inductance, the number of ceramic layers having the internal electrode patterns must be reduced and the ceramic layers without the internal electrode pattern must be increased accordingly.

However, when the multilayer type electronic parts are manufactured using the thin ceramic layers in order to obtain a relatively small inductance value, the multilayer type electronic parts become saddled with an unwanted stray capacity due to capacitance generated between the internal electrode patterns of the ceramic layers. To be more specific, in the multilayer type ceramic inductor, when the number of turns in the coil is reduced to obtain a relatively low inductance, the stray capacity thereof increases, resulting in deteriorating the performance characteristics of the multilayer type ceramic inductor.

SUMMARY OF THE INVENTION

It is, therefore, a primary object of the present invention to provide multilayer type electronic parts having different inductance values from each other which are manufactured by using identical ceramic green sheets.

It is another object of the present invention to provide a multilayer type electronic part having a relatively small stray capacity, although it may be manufactured so as to have a relatively small number of turns in the coil and hence a relatively small inductance value.

The objectives described above are achieved by the following process. First, a plurality of multilayer type electronic parts are provided with a coil thereinside formed with internal electrode patterns, have different number of turns on the coil and hence the different inductance values, and are formed using ceramic layers formed using identical green ceramic sheets. Thereafter, at least one ceramic layers which are not formed with the internal electrode pattern are interposed between the ceramic layers having internal electrode patterns, the internal electrode patterns of the ceramic layers having at least one ceramic layers therebetween are electrically connected to each other through connecting means such as through-holes formed on the ceramic layers and filled with a conductive material.

The multilayer type electronic part in accordance with the present invention includes a laminated structure formed by stacking a plurality of first and second ceramic layers, the first ceramic layers being provided with internal electrode patterns on top thereof, the second ceramic layers having no internal electrode pattern and being located at a top and a bottom portions of the laminated structure, respectively, the internal electrode patterns being connected to each other to form a coil inside the laminated structure, a pair of external electrodes provided at two opposing sides of the laminated structure and connected to the coil, the multilayer type electronic part further comprising one or more third ceramic layers, each of the third ceramic layers not including internal electrode pattern and being interposed between the first ceramic layers, and means for connecting the internal electrode patterns formed on the first ceramic layers to form the coil.

The connecting means is the conductive material filled in the through-holes formed on the ceramic layers without the internal electrode pattern.

The ceramic layer without the internal electrode pattern is composed of at least one ceramic sheets. The ceramic sheets may be composed of a plurality of ceramic sheets which are formed with the through-holes pierced at predetermined locations of the ceramic sheets by using a laser beam in advance. The ceramic sheets may be stacked on top of each other in the form of a single layer.

When the through-hole is pierced at the ceramic sheet by using the laser beam, the diameter of the through-hole on one surface of the ceramic sheet upon which the laser beam is incident is greater than the diameter of the through-hole at the other surface of the ceramic sheet through which the laser beam exits. The thicker the ceramic sheet is, the greater the difference between the diameters of the through-holes at the both surfaces of the ceramic sheet is. Accordingly, when the ceramic layer having a predetermined thickness is employed, it is preferable that the ceramic layer is made of the single layer obtained by stacking a plurality of ceramic layers having the relatively small thickness on top of each other in such a way that the through-holes of the ceramic layers is coaxially aligned, whereby it is possible to reduce the difference between the diameters of the through-holes at the both surfaces of the ceramic layer.

At least one ceramic layers without the internal electrode pattern are interposed between ceramic layers with the internal electrode patterns which together, form one turn or between ceramic layers with the internal electrode patterns, each of which has a half turn. The number of the ceramic layers without the internal electrode pattern stacked can be controlled, depending on the number of turns in the internal electrode patterns of the multilayer type electronic part.

In addition, the ceramic layers of the laminated structure may be stacked in a direction perpendicular to the direction in which the external electrodes are opposite to each other or may be in a direction identical to the direction in which the external electrodes are opposite to each other.

In such a multilayer type electronic part, as a result of at least one ceramic layers without the internal electrode pattern being interposed between the ceramic layers having the internal electrode patterns, the separation between the internal electrode patterns increases and stray capacity therebetween decreases, allowing the multilayer type electronic part having relatively small stray capacity to be manufactured by stacking relatively thin ceramic layers. Further, the conductive material filled in the through-holes formed on the ceramic layers allows the internal electrode patterns to be electrically connected to each other inside the laminated structure.

Since relatively thin ceramic layers are stacked, identical ceramic green sheets can be both used in manufacturing the multilayer type electronic part having a relatively small inductance value and a relatively small number of turns in the coil formed by the internal electrode patterns and the multilayer type electronic part having a relatively larger inductance value or a relatively large number of turns in the coil formed by the internal electrode patterns. In the other words, it is possible to manufacture the multilayer type electronic parts having different inductance values from each other, using the identical ceramic green sheets.

In the multilayer type electronic part having the ceramic layers stacked in a direction identical to the direction in which the external electrodes are opposite to each other, the external electrodes are electrically connected to the internal electrode patterns through the conductive material filled in the through-holes. Therefore, when the relatively many ceramic layers are stacked at the vicinity of the external electrodes the concentration of the conductive material is generated at the vicinity of the external electrodes.

In this case, it is easy that the distortion is generated at the interior of the laminated structure due to the stress, lowering the resistance thereof.

However, in the multilayer type electronic part in accordance with the present invention, since the conductive material is provided at the ceramic layer at the vicinity of the external electrodes and the ceramic layer provided with the conductive material is interposed between the ceramic layers having the internal electrode patterns, the number of the ceramic layers which are stacked at the vicinity of the external electrodes and have the conductive material is small. Accordingly, it is possible to prevent the concentration of the conductive material at the vicinity of the external electrodes preventing the reduction of the resistance of the laminated structure.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1:
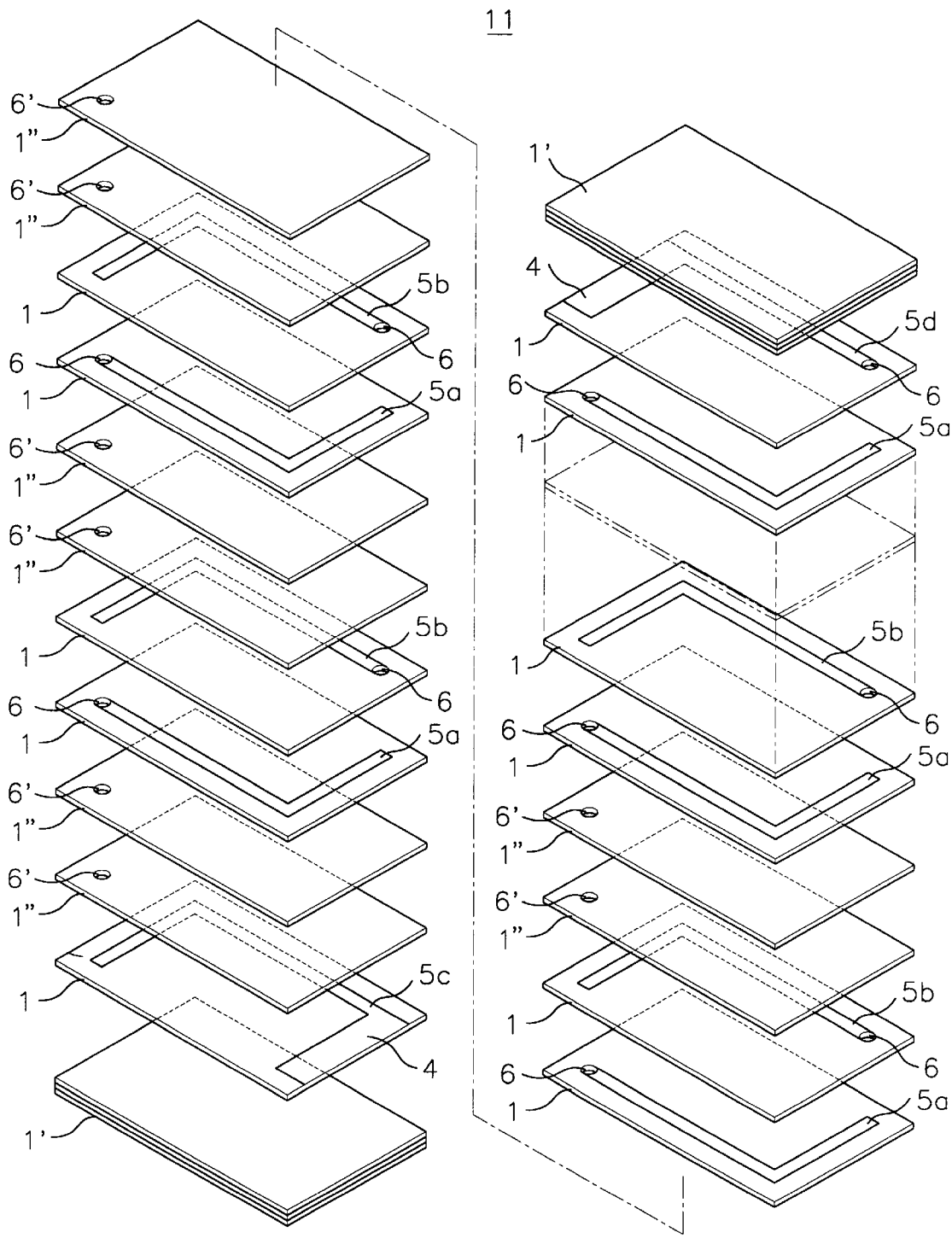
FIG. 1 describes an exploded perspective view of a laminated structure of the multilayer type electronic part in accordance with a first preferred embodiment of the present invention.

There is shown in FIG. 1 an exploded perspective view of a laminated structure of a multilayer type ceramic inductor as an example of a multilayer type electronic part in accordance with the present invention. This laminated structure is generally obtained using the method described hereinbelow.

First, a plurality of relatively thin magnetic ceramic green sheets are formed from magnetic slurry by using a doctor blade method or an extrusion molding method, wherein the magnetic slurry includes magnetic powders such as ferrite powders dispersed in a binder. The ceramic green sheets are, respectively, perforated so as to form through-holes (via holes) at predetermined locations. Thereafter, some ceramic green sheets are printed so as to be formed with internal electrode patterns thereon using a conductive paste such as a silver paste. At the same time, the through-holes are filled with a conductive material.

Next, the ceramic green sheets are stacked in the following manner. That is, the plurality of magnetic ceramic green sheets on which the internal electrode pattern are not printed are stacked, and then depending on the desired number of turns, the ceramic green sheets having various internal electrode patterns are subsequently stacked thereon. Thereafter, the ceramic green sheets without the internal pattern are stacked on top thereof.

The laminated structure is then pressed, diced into unit chips which are then sintered to obtain sintered structures 11.

FIG. 1 shows an exploded view of the laminated structure manufactured in the manner described above. As shown, the laminated structure 11 includes a plurality of ceramic layers 1, 1 . . . , 1', 1' . . . , 1", 1, 1" in the form of a single layer.

Of the ceramic layers 1, 1 . . . , 1', 1' . . . , 1", 1", only the ceramic layers 1, 1 . . . are formed with the internal electrode patterns 5a–5d.

Figure 3:
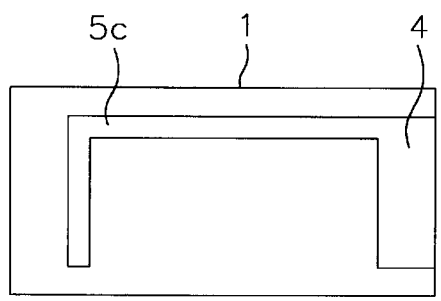
FIGS. 3A to 3D illustrate plan views of ceramic layers constituting the laminated structure in FIG. 1, respectively.
Figure 3:
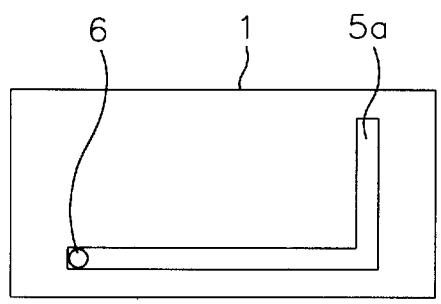
Figure 3:
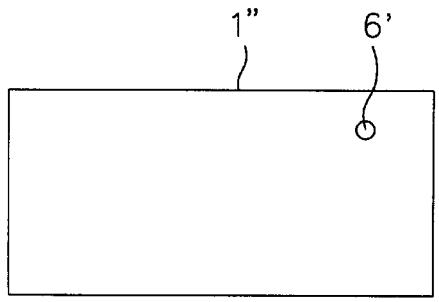
Figure 3:
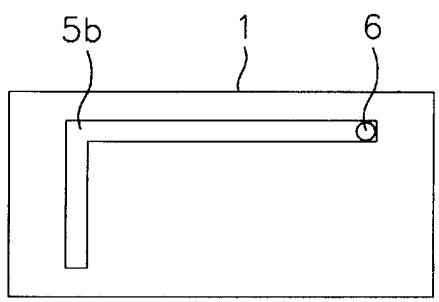

When viewed in FIG. 1, a bottom and a top ceramic layers 1, 1 which are, respectively located at bottom and at top of the laminated structure 11 formed by stacking the ceramic layers having the internal electrode patterns 5a–5d respectively include the internal electrode patterns 5c, 5d, wherein the internal electrode patterns 5c, 5d function as lead electrodes 4, 4, one end of each of the lead electrodes being located by being exposed at the opposing sides of the laminated structure 11. There is shown in FIG. 3A a plan view of the ceramic layer 1 having the bottom internal electrode pattern 5c in FIG. 1. The top internal electrode pattern 5d is formed with a through-hole 6 for the electrical connection with the internal electrode pattern 5a of the ceramic layer 1 therebelow at its end portion by filling the through-hole 6 with a conductive material.

The internal electrode patterns 5a, 5b formed on the ceramic layers 1, 1 . . . between the ceramic layers 1, 1 having the internal electrode patterns 5c, 5d have a half turn, e.g., L shape, respectively. The internal electrode patterns 5a, 5b are respectively provided with through-holes 6, 6 for electrically connecting same with the end portions of the neighboring internal electrode patterns 5a, 5b, 5c, the through-hole 6 being filled with the conductive material. There are, respectively, shown in FIGS. 3B, 3D plan views of the ceramic layers 1, 1 having the internal electrode patterns 5a, 5b.

Further, a pair of ceramic layers 1", 1" having only through-holes 6' without the internal electrode pattern are disposed between every two pairs of ceramic layers 1, 1 . . . having the internal electrode patterns 5a–5d. There is shown in FIG. 3C a plan view of the ceramic layer 1". As shown in FIG. 1, the pair of ceramic layers 1", 1" are disposed between every two pairs of ceramic layers 1, 1, 1, 1 having the internal electrode patterns which together, form one complete turn. The through-holes 6', 6' formed on these ceramic sheets 1", 1" are positioned at a location corresponding to that of the through-hole 6 of the ceramic layer 1 stacked immediately thereon.

The internal electrode patterns 5a–5d provided on the ceramic layers 1, 1 . . . constituting the laminating structure 11 are subsequently electrically connected to each other through the through-holes 6, 6' filled with the conductive material of the ceramic layers 1, 1 . . . and the ceramic layers 1", 1" therebetween, resulting in forming a coil inside of the laminating structure 11. The ceramic layers 1, 1 . . . made of the magnetic ceramic function as a magnetic core of the coil.

Further, on top and bottom of the laminated structure composed of the ceramic layers 1, 1 . . . having the internal electrode patterns 5a–5d and the ceramic layers 1", 1" . . . having the through-holes 6', 6' . . . are, respectively, stacked the ceramic layers 1', 1' which are not provided with the internal electrode pattern and are called blank ceramic layers.

Figure 2:
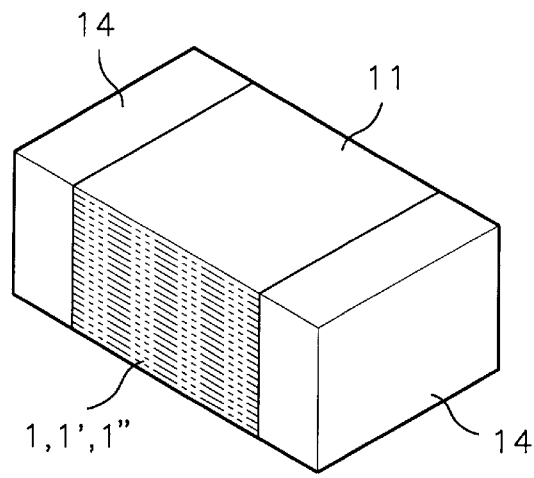
FIG. 2 shows an exploded perspective view setting forth the multilayer type ceramic inductor in accordance with the first preferred embodiment.

Referring to FIG. 2, the laminated structure 11 has a pair of external electrodes 14, 14 at two opposing sides, the external electrodes 14, 14 being formed by applying a conductive paste such as silver paste on the forgoing two opposing sides of the laminated structure 11 and heating it to force the paste to stick thereon. Thereafter, if desired, a nickel coating or a solder coating may be additionally applied thereon. The external electrodes 14, 14 are electrically connected to the lead electrodes 4, 4 (see FIG. 1) exposed at the foregoing opposing sides of the laminated structure 11. There is shown in FIG. 2 an exemplary inductor formed with the internal electrode patterns 5a–5d, wherein the internal electrode patterns, together form the coil and have its both ends electrically connected to the external electrodes 14, 14. In FIG. 2, the laminated ceramic layers 1 . . . , 1' . . . are shown by the two-dot chain line.

In such a laminated ceramic inductor, since two ceramic layers 1", 1" without the internal electrode pattern are interposed between every two pairs of ceramic layers 1, 1, 1, 1 respectively having the internal electrode patterns which together form one turn of the coil, each of the turns being separated by two ceramic layers 1", 1", thereby lowering the capacitance therebetween. Consequently, using this method, the multilayer type ceramic inductor having a reduced stray capacity may be manufactured with the relatively thin ceramic layers 1, 1 . . . , 1', 1' . . . , 1", 1".

Although the above discussions have been presented referring to a situation where only a pair of ceramic layers 1", 1" having the through-holes 6', 6' only are interposed between every two pairs of ceramic layers 1, 1, 1, 1 having the internal electrode patterns which together, form one turn in the coil, the number of the ceramic layers 1", 1" interposed therebetween can be varied, depending on the total number of turns required. To be more specific, when the total number of turns required is low, a large number of ceramic layers 1", 1" may be disposed therebetween and vice versa, thereby forming the multilayer type ceramic inductor shown in FIG. 2 within the preset dimension.

Figure 4:
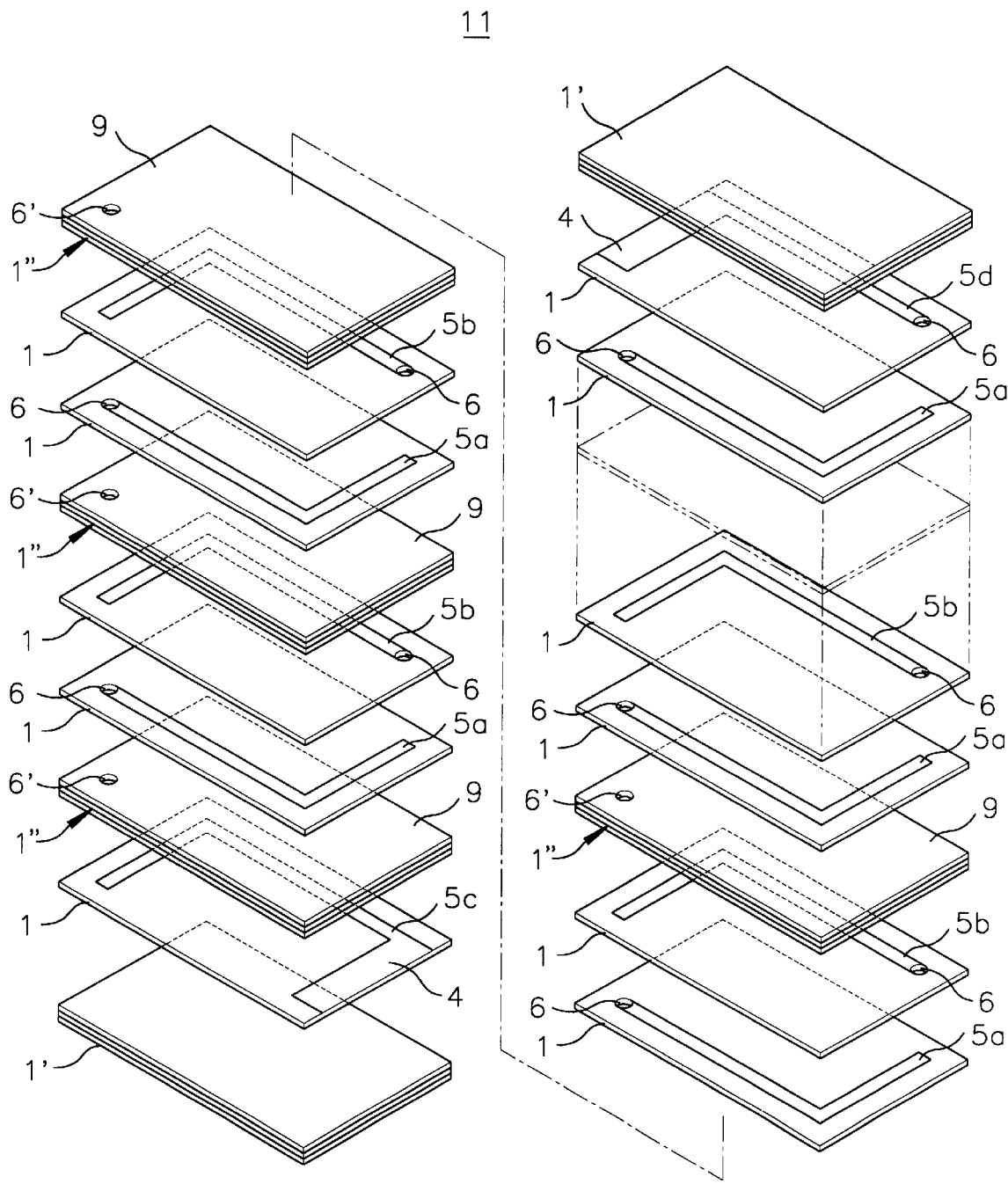
FIG. 4 describes an exploded perspective view of a laminated structure of the multilayer type electronic part in accordance with a second preferred embodiment of the present invention.

There is shown in FIG. 4 an exploded perspective view of a laminated structure 11 of a multilayer type ceramic inductor of a second preferred embodiment in accordance with the present invention. This embodiment is similar to the first embodiment except that a single layer composed of a plurality of ceramic sheets 9 stacked on top of each other is used as the ceramic layer 1" without the internal electrode pattern.

Figure 5:
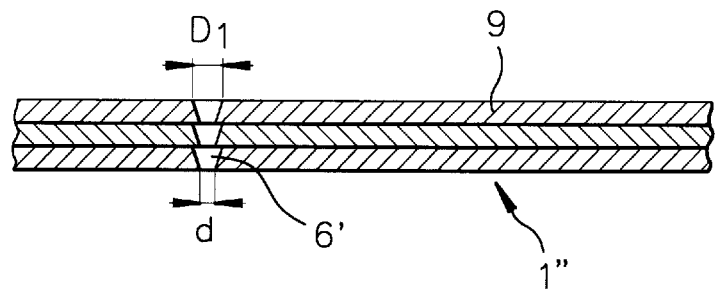
FIG. 5 depicts partial longitudinal cross sectional view of the ceramic layer without an internal electrode pattern in accordance with the second embodiment.

Referring to FIG. 5, each of the ceramic sheets 9 constituting the ceramic layer 1" has at its predetermined location a through-hole 6' formed by using the laser beam in such a way that when the ceramic sheets 9, 9 . . . are stacked on top of each other, they form the single layer with the through-holes 6', 6' on the ceramic sheets 9 being aligned with each other, forming a through-hole 6 perforating the ceramic layer 1" across the thickness thereof.

Figure 6:
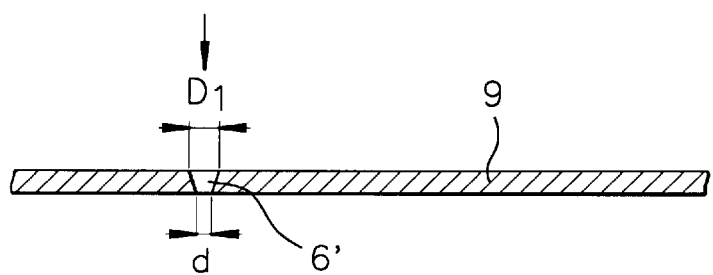
FIGS. 6A and 6B present partial longitudinal cross sectional views illustrating the difference between diameter of a through-hole formed on a relatively thin ceramic sheet and that of a through-hole formed a relatively thick ceramic sheet using the laser beam, respectively.
Figure 6:
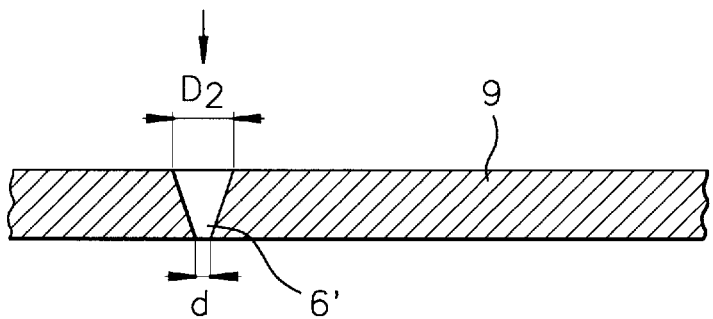

There are shown in FIGS. 6A, 6B, exemplary views setting forth a difference between diameter of the through-hole 6' formed on a relatively thin ceramic sheet 9 and that of the through-hole 6' formed on a relatively thick ceramic sheet 9, using the laser beam.

When the through-hole 6' is perforated by using the laser beam, the diameters "D1", "D2" indicated by arrows on one surface of the ceramic sheet 9 upon which the laser beam is incident are greater than the diameter "d" of the through-hole 6' at the other surface of the ceramic sheet 9 through which the laser beam exits. If the ceramic sheet 9 in FIG. 6B is three times as thick as the ceramic sheet 9 in FIG. 6A, in order to obtain the diameters "d", "d" in FIGS. 6A, 6B, the diameter D2 must be three times as large as the diameter "D1". In other words, for a relatively thick ceramic sheet 9, in order to obtain the diameter "d" as the diameter of the through-hole to be filled with the conductive material, the diameter D2 on the incident surface of the relatively thick ceramic sheet 9 must three times as large as the diameter D1, unnecessarily occupying portions of the ceramic layer 1" which may otherwise be put to other uses, e.g., core or marginal areas, which, in turn, may deteriorate the performance characteristics of the multilayer type electronic part.

When the ceramic layer 1" having the predetermined thickness is employed, each of the relatively thin ceramic sheets 9 is formed with the through-hole 6' at its predetermined location and is stacked on top of each other so as to form the single layer. Accordingly, as shown in FIG. 5, the diameter of the incident surface of the single ceramic layer 1" becomes identical to the diameter "D1" described above, whereby in comparison to when the ceramic layer 1" is one layer having an identical thickness as that of the single ceramic layer 1" composed of the plurality of the ceramic sheets 9, 9 . . . , the diameter of the through-hole 6' can be reduced into about 1/n, wherein n is the stacked number of the ceramic sheets constituting the single ceramic layer 1". In FIG. 5, n is 3.

When the diameter of the through-hole 6' of the ceramic layer 1" is relatively large, it results in unnecessarily occupying portions which otherwise may be put to other uses, e.g., core or marginal areas, deteriorating the performance characteristics of the multilayer type electronic part such as the inductor. For example, when the multilayer type electronic part is an inductor, the quality coefficient (Q) thereof is reduced as a consequence of this.

These problems can be solved by the manner described above, i.e, by forming the through-holes 6' on the relatively thin ceramic sheets 9 and stacking the relatively thin ceramic sheets 9 on top of each other to form the single ceramic layer.

Figure 7:
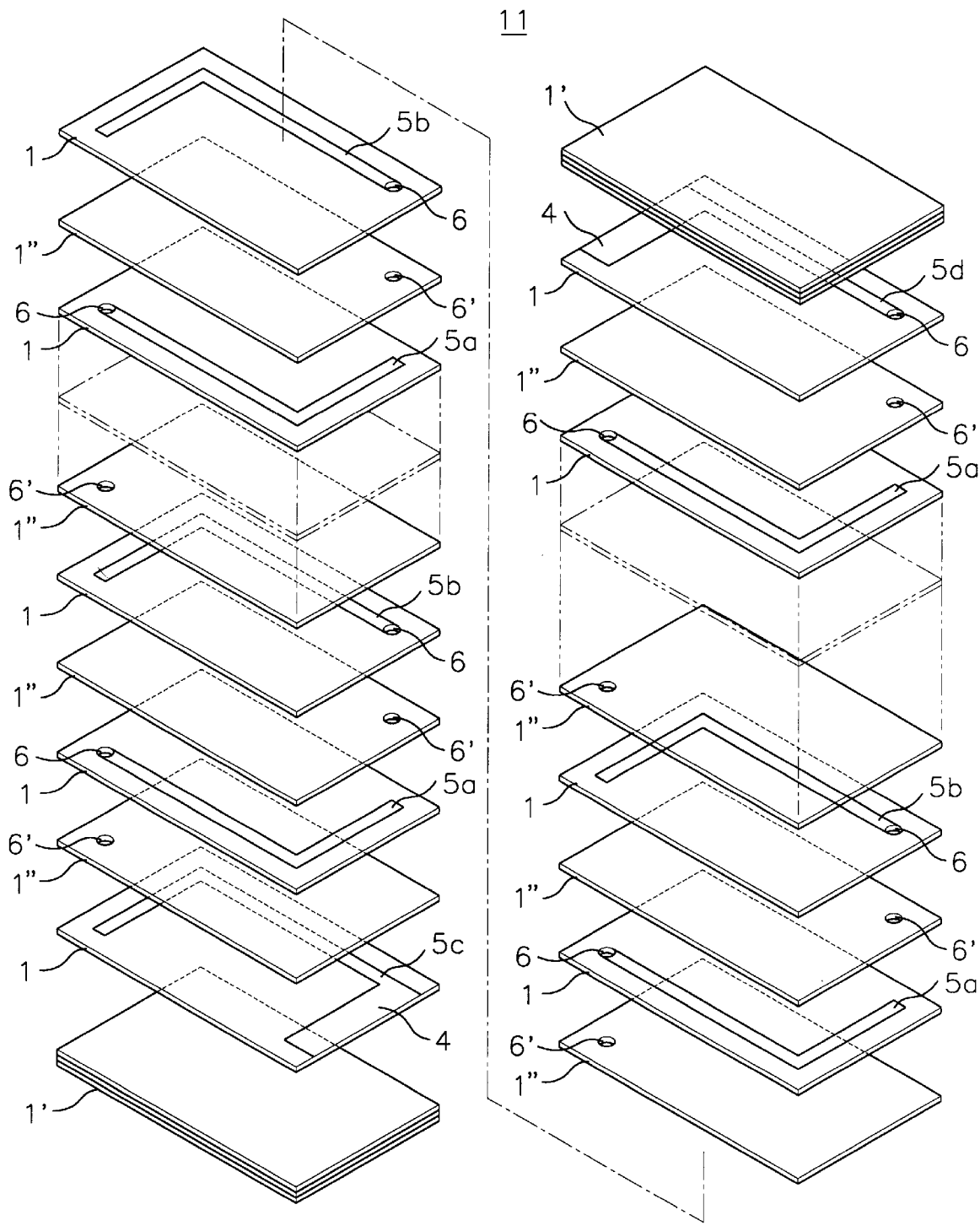
FIG. 7 describes an exploded perspective view of a laminated structure of the multilayer type electronic part in accordance with a third preferred embodiment of the present invention.

There is shown in FIG. 7 an exploded perspective view of a laminated structure 11 of a multilayer type ceramic inductor of a third preferred embodiment in accordance with the present invention. This embodiment is different from the first one shown in FIG. 1 in that the ceramic layers 1" are, respectively, interposed between every two ceramic layers 1 having half turned internal electrode patterns.

To be more specific, the internal electrode patterns 5a5d formed on the ceramic layers 1, 1 . . . constituting the foregoing laminated structure 11 are subsequently electrically connected to each other through the through-holes 6, 6' filled with a conductive material formed respectively on the ceramic layers 1, 1 . . . and the ceramic layers 1", 1" . . . between the ceramic layers 1, 1 . . . , thereby forming a coil inside the laminated structure 11. Further, the ceramic layers 1" is interposed between every two ceramic layers 1 having half turned internal electrode patterns 5a–5d, the ceramic layer 1" without the internal electrode pattern being formed with the through-holes 6' only for electrically connecting the internal electrode patterns 5a–5d of the stacked ceramic layers 1, 1 . . . to each other. This embodiment is similar to the first one except for the above.

In such a multilayer type ceramic inductor, since the ceramic layer 1" without the internal electrode pattern is interposed between every two ceramic layers 1 having half turned internal electrode patterns 5a–5d, the half turned internal electrode patterns 5a–5d are separated by the ceramic layer 1", lowering capacitance therebetween. Consequently, it is possible to obtain the multilayer type inductor having a relatively small stray capacity.

In this embodiment, as the number of turns in the coil decrease, the number of ceramic layers 1" that may be disposed between the pair of ceramic layers 1, 1 increases. That is, a plurality of the ceramic layers 1" may be interposed between the pair of ceramic layers 1, 1. In addition, similar to the second embodiment shown in FIGS. 4, 5, it is possible to employ the single ceramic layer 1" composed of the plurality of ceramic sheets 9, by forming the through-holes 6' at the predetermined locations thereof and stacking the plurality of thin ceramic sheets 9 on top of each other.

Figure 8:
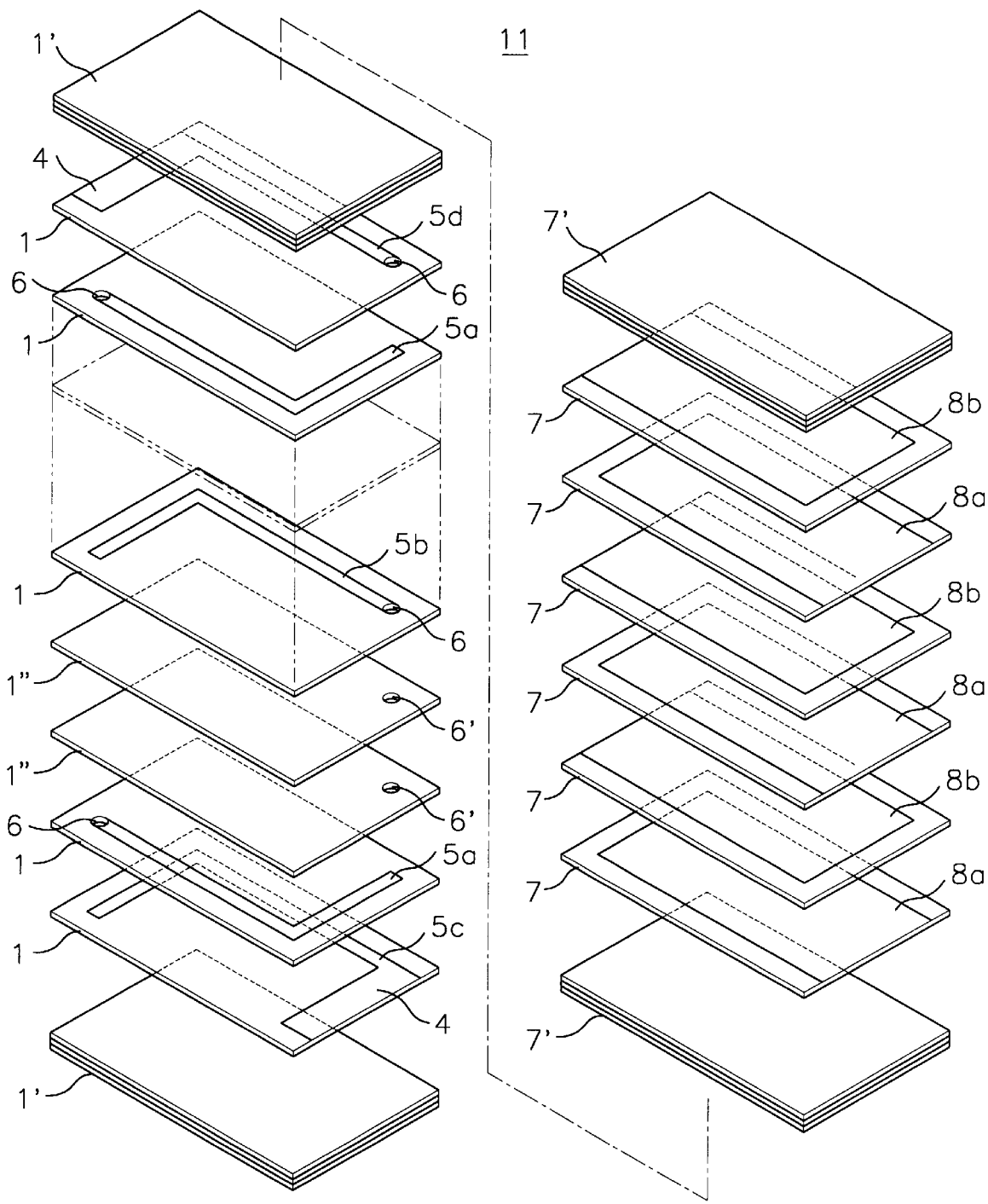
FIG. 8 shows an exemplary multilayer type electronic part when it is employed in a multilayer type LC part.

There is shown in FIG. 8 a multilayer type LC part in accordance with the present invention. Since, in FIG. 8, a portion of the inductor at left is similar to the first embodiment shown in FIG. 1, the detailed description thereof will be omitted.

The fabrication of multilayer type composite electronic part begins with the preparation of the magnetic ceramic green sheets as well as the dielectric ceramic green sheets using a dielectric powder such as a titania. Thereafter, there are formed on some dielectric ceramic green sheets internal terminal patterns using a conductive paste such as a silver paste.

Next, after laminating the magnetic ceramic green sheets, in a similar manner to the manufacture of the foregoing multilayer type ceramic inductor, on the laminated magnetic ceramic green sheets are stacked the dielectric ceramic green sheets on which the internal electrode pattern are not printed, and thereon are stacked the ceramic green sheets having the internal electrode patterns in such a way that, when one of the ceramic green sheets is turned 180 degrees on an imaginary plane parallel thereto, its internal electrode pattern is allowed to be overlapped with the neighboring internal electrode patterns. The number of the dielectric ceramic green sheets stacked can be controlled, depending on the capacitance desired. On the stacked dielectric ceramic green sheets are further stacked dielectric green sheets on which the internal electrode patterns are not printed.

The stacked order of dielectric ceramic green sheets and the magnetic ceramic green sheets is reversible. To be more specific, after stacking the dielectric ceramic green sheets, the magnetic ceramic green sheets may be stacked thereon.

After this laminated structure is pressed, it is diced into unit chips and is sintered to obtain a sintered laminated structure 11.

There is shown in FIG. 8 the laminated structure 11 obtained using the steps described above. As shown, the laminated structure 11 includes a plurality of ceramic layers 1, 1', 1", 7, 7' stacked on top of each other.

The magnetic ceramic layers 1, 1 . . . are formed with coiled internal electrode patterns 5a–5d, and between the ceramic layers having the internal electrode patterns which together, form one turn are interposed two ceramic layers 1", 1" having only through-holes 6', 6'.

The internal electrode patterns 5a–5d of the ceramic layers 1, 1 . . . constituting the laminated structure 11 are subsequently electrically connected to each other through the conductive material in the through-holes 6, 6' respectively formed on the ceramic layers 1, 1 . . . and the ceramic layers 1", 1" . . . therebetween, thereby forming the coil inside the laminated structure 11.

In FIG. 8, a bottom and a top ceramic layers 1, 1 which are, respectively, located at bottom and at top of the stacked ceramic layers 1, 1 . . . having the internal electrode patterns 5a–5d are, respectively, formed with the internal electrode patterns 5c, 5d, wherein the internal electrode patterns 5c, 5d function as the lead electrodes 4, 4 by being exposed at the opposing sides of the laminated structure 11.

Below the bottom ceramic layer 1 and above the top ceramic layer 1 are, respectively, disposed the ceramic layers 1', 1' which are not formed with the internal electrode pattern and are called blank ceramic layers.

On the blank ceramic layers 1' disposed above the top ceramic layer 1 are stacked the dielectric ceramic layers 7' which are not formed with the internal electrode pattern and are called blank ceramic layers, and thereon, the dielectric ceramic layers 7, 7 . . . having the internal electrode patterns 8a, 8b. Finally, on top dielectric ceramic layer 7 are stacked dielectric ceramic layers 7' without the internal electrode pattern.

The internal electrode patterns 8a, 8b formed on the successive dielectric ceramic layers 7, 7 . . . are in an opposite relationship to each other in that one end thereof are exposed alternatingly along the two opposing sides of the laminated structure 11 at which the internal electrode patterns 5c, 5d are exposed.

Similar to the foregoing multilayer type ceramic inductor, the multilayer type LC part includes the external electrodes 14, 14 as shown in FIG. 2, allowing the inductor portion and the capacitor portion to be electrically connected to each other in parallel.

By having such a structure, the stray capacity in the inductor portion thereof can be lowered.

Further, similar to the second preferred embodiment in FIGS. 4, 5, by having the through-holes 6' at the predetermined locations, it is possible to employ the single ceramic layer 1" composed of a plurality of ceramic sheets 9 stacked on top of another.

Figure 9:
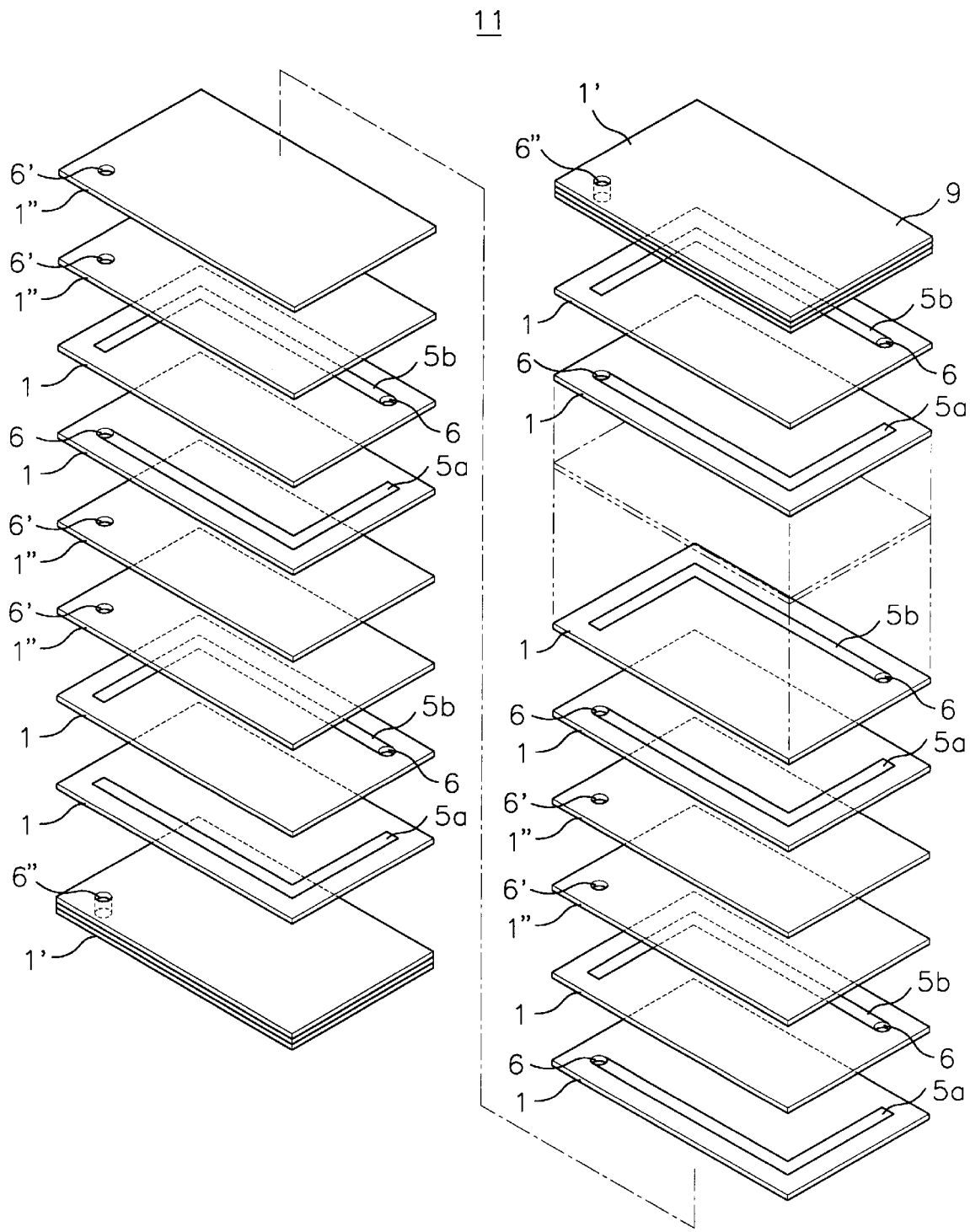
FIG. 9 describes an exploded perspective view of a laminated structure of the multilayer type electronic part in accordance with a fourth preferred embodiment of the present invention.

There is shown in FIG. 9 a laminated structure 11 of a multilayer type ceramic inductor of a fourth preferred embodiment in accordance with the present invention.

In the foregoing embodiments, the plurality of ceramic layers 1, 1 . . . , 1', 1' . . . , 1", 1" . . . are stacked in a direction perpendicular to the external electrodes 14, 14, and the external electrodes 14, 14 and the coil formed by the internal electrode patterns 5a–5d are electrically connected to each other through the lead electrodes 4, 4 provided at one of ends of the internal electrode patterns 5c, 5d.

In comparison with this, in the fourth embodiment, the external electrodes 14, 14 (see FIG. 10) are formed on top and bottom of the laminated structure shown in FIG. 9.

In this case, the blank ceramic layers 1', 1' located at top and bottom of the laminated structure 11 are formed with the through-holes 6", 6" filled with the conductive material.

As shown in FIG. 9, each of the internal electrode patterns 5a, 5d formed on the ceramic layers 1, 1 . . . between the ceramic layers 1', 1' have a half turn, as the third embodiment described above. There are, respectively, shown in FIGS. 11A, 11B plan views of the ceramic layers 1, 1 having the internal electrode patterns 5a, 5b.

Further, between every two pairs of ceramic layers 1, 1, 1, 1 are interposed the pair of ceramic layers 1" which are not provided with the internal electrode pattern and have only the through-holes 6'. There is shown in FIG. 11C a plan view of the ceramic layer 1". In FIG. 9, between every two pairs of ceramic layers 1, 1, 1, 1 are interposed two ceramic layers 1", 1" having the internal electrode patterns 5a, 5b which together, form one turn of the coil. The through-holes 6', 6' formed on the ceramic layers 1", 1" are positioned at an identical location as the through-holes 6, 6 of the ceramic layers 1, 1 stacked on the ceramic layers 1", 1" shown in FIG. 1.

The internal electrode patterns 5a, 5b provided on the ceramic layers 1, 1 . . . constituting the laminating structure 11 are subsequently electrically connected to each other through the through-holes 6, 6' filled with the conductive material of the ceramic layers 1, 1 . . . and the ceramic layers 1", 1" therebetween, resulting in forming the coil inside the laminating structure 11.

Further, above and below the laminated structure which includes the ceramic layers 1, 1 . . . having the internal electrode patterns 5a, 5b and the ceramic layers 1", 1" . . . having the through-holes 6', 6' . . . are, respectively, disposed the ceramic layers 1', 1' . . . called the blank ceramic layers which are not formed with the internal electrode pattern and have only the through-holes 6", and on both sides of the laminated structure 11 are, respectively, stacked the blank ceramic layers 1', 1' which have the through-holes 6" filled with the conductive material. There is shown in FIG. 11D a plan view of the blank ceramic layer 1'.

Figure 10:
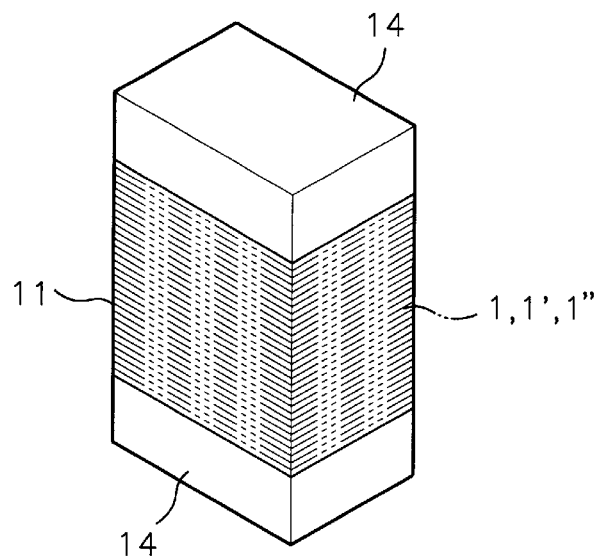
FIG. 10 shows an exploded perspective view setting forth the multilayer type ceramic inductor in accordance with the fourth preferred embodiment.

As shown in FIG. 10, a conductive paste such as a silver paste is applied on top and bottom of the laminated structure 11 formed by stacking the ceramic layers 1', 1' at which conductive material in the through-holes 6", 6" of the laminated structure 11 is exposed. The laminated structure 11 is then heated to allow the conductive paste to stick thereon to form the external electrodes 14, 14. In this case, if desired, the nickel coating or the solder coating may be additionally applied. The external electrodes 14, 14 are electrically connected to the conductive material filled in the through-holes 6", 6" of the outermost ceramic layers 1', 1' of the laminated structure 11. As a result, as shown, the external electrodes 14, 14 are connected to both sides of the inductor having the internal electrode patterns 5a, 5b. In FIG. 10, the way in which the ceramic layers 1 . . . , 1' . . . are stacked is shown by the two-dot chain line.

In the inductor in accordance with the fourth embodiment, between every pairs of ceramic layers 1, 1, 1, 1 having the internal electrode patterns which together, forms one turn of the coil are disposed two ceramic layers 1", 1" without the internal electrode pattern, which, in turn, lower capacitance therebetween. Consequently, by forming the multilayer type ceramic inductor having a relatively small number of turns in the coil using the relatively thin ceramic layers 1, 1 . . . , 1', 1' . . . , 1", 1", it is possible to reduce the stray capacity.

In this embodiment, as the total number of turns in the coil decreases, the number of ceramic layers 1" interposed between the ceramic layers 1, 1 increases.

Figure 11:
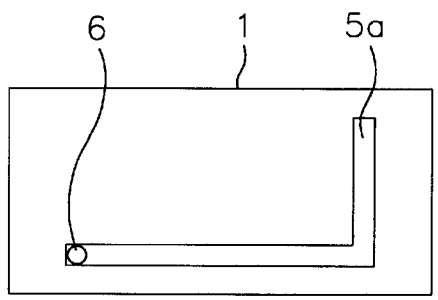
FIGS. 11A to 11D illustrate plan views of ceramic layers constituting the laminated structure in FIG. 9, respectively.
Figure 11:
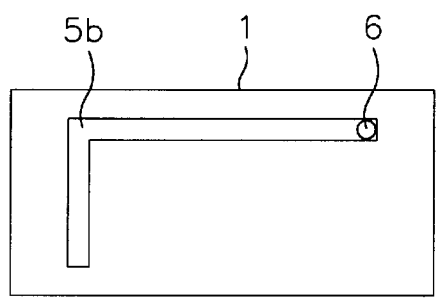
Figure 11:
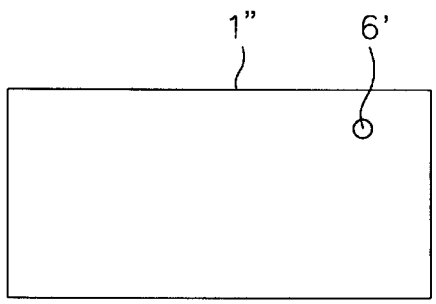
Figure 11:
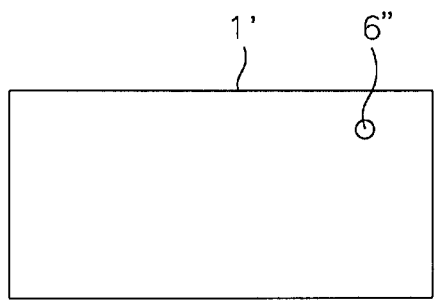
Figure 12:
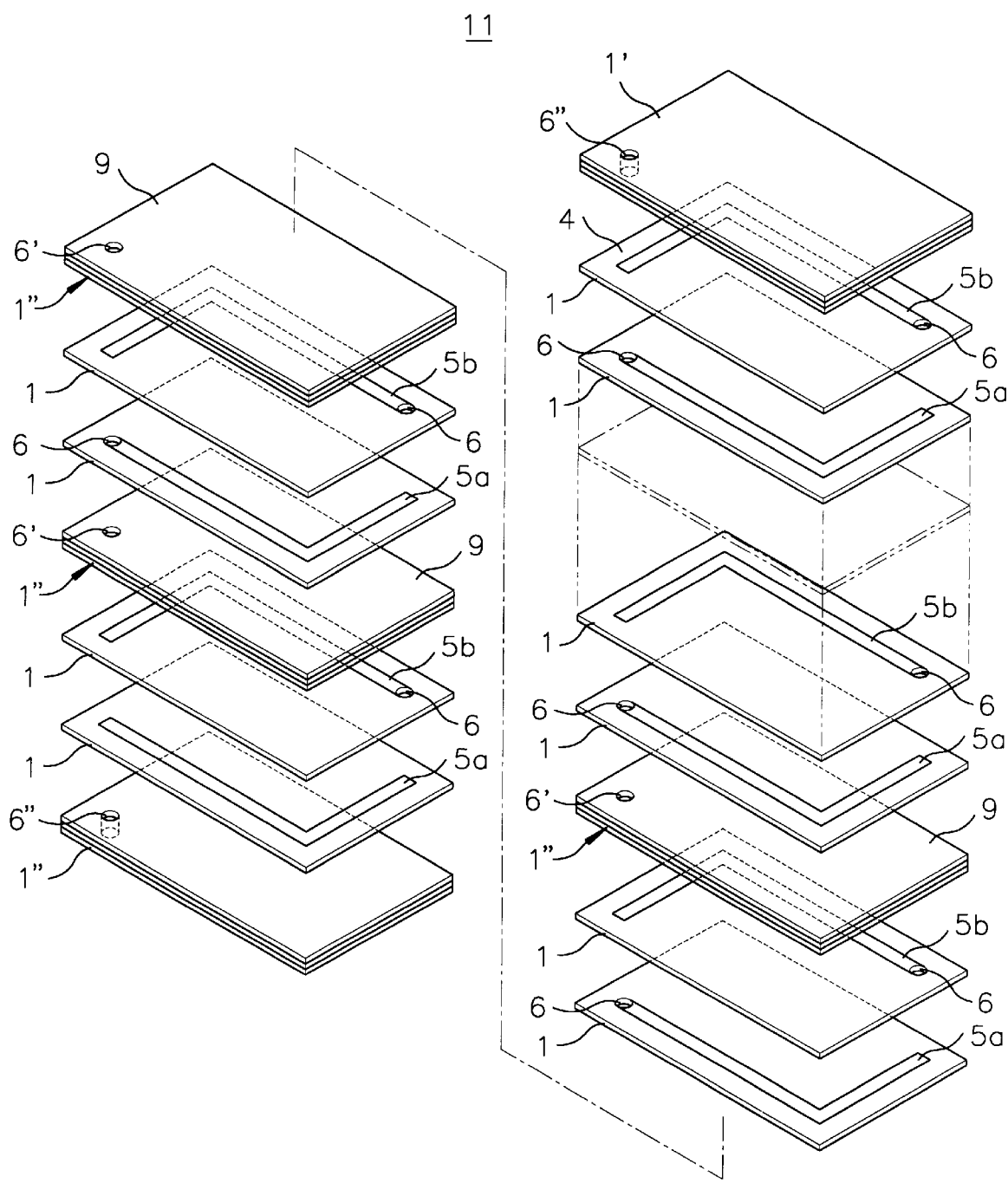
FIG. 12 shows an exploded perspective view setting forth the multilayer type ceramic inductor in accordance with the fifth preferred embodiment.

The fifth embodiment shown in FIG. 12 is similar to the fourth embodiment shown in FIGS. 9 to 11 in that the pair of external electrodes 14, 14 are formed on top and bottom of the ceramic layers 1, 1 . . . , 1', 1' . . . , 1", 1" . . . and similar to the second embodiment shown in FIGS. 4, 5 in that the through-holes 6' are formed on the predetermined locations of each of the thin ceramic sheets 9 and the plurality of ceramic layers 9 are stacked on top of each other so as to form the single layer functioning as the ceramic layer 1".

Figure 13:
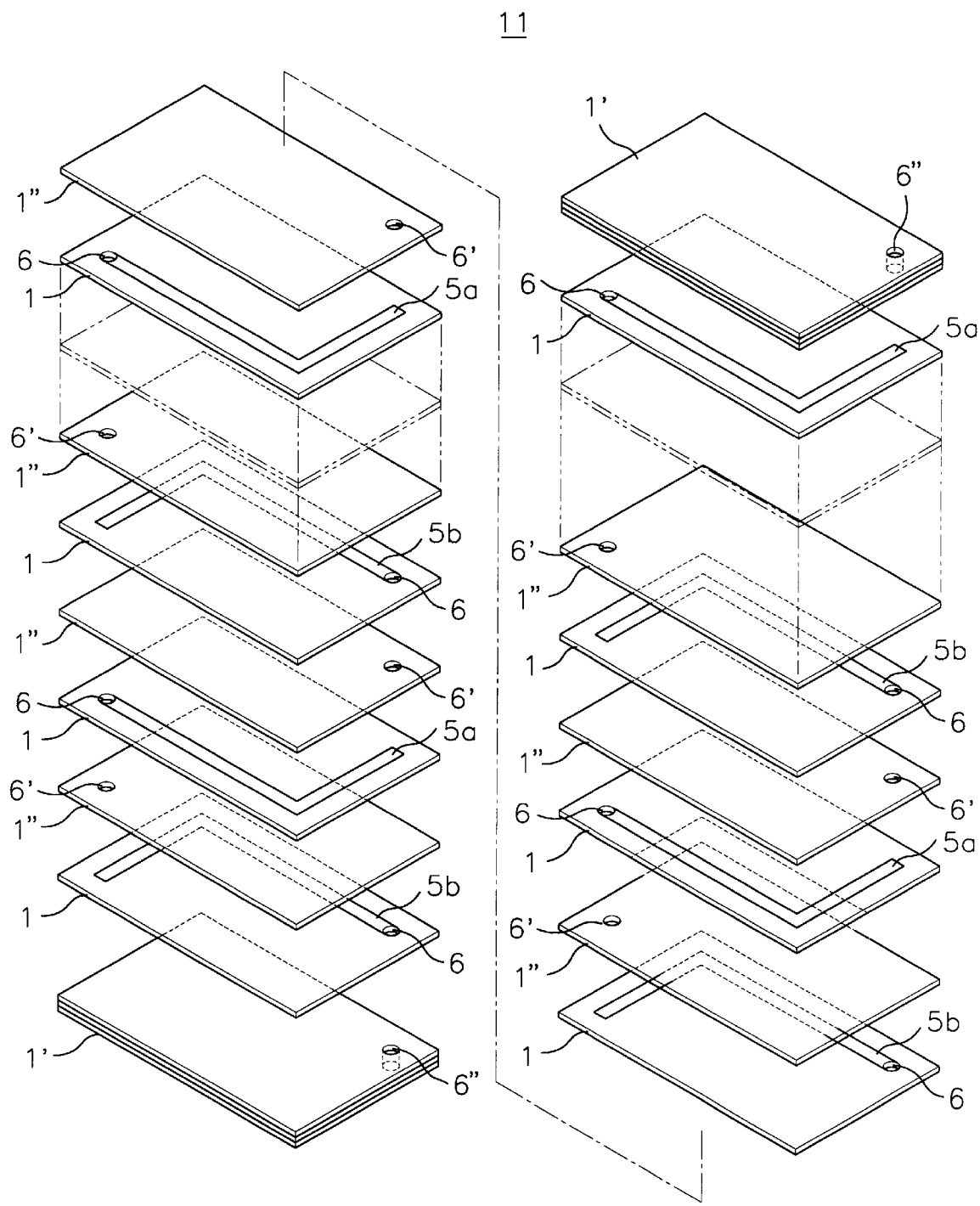
FIG. 13 shows an exploded perspective view setting forth the multilayer type ceramic inductor in accordance with the sixth preferred embodiment.
Figure 14:
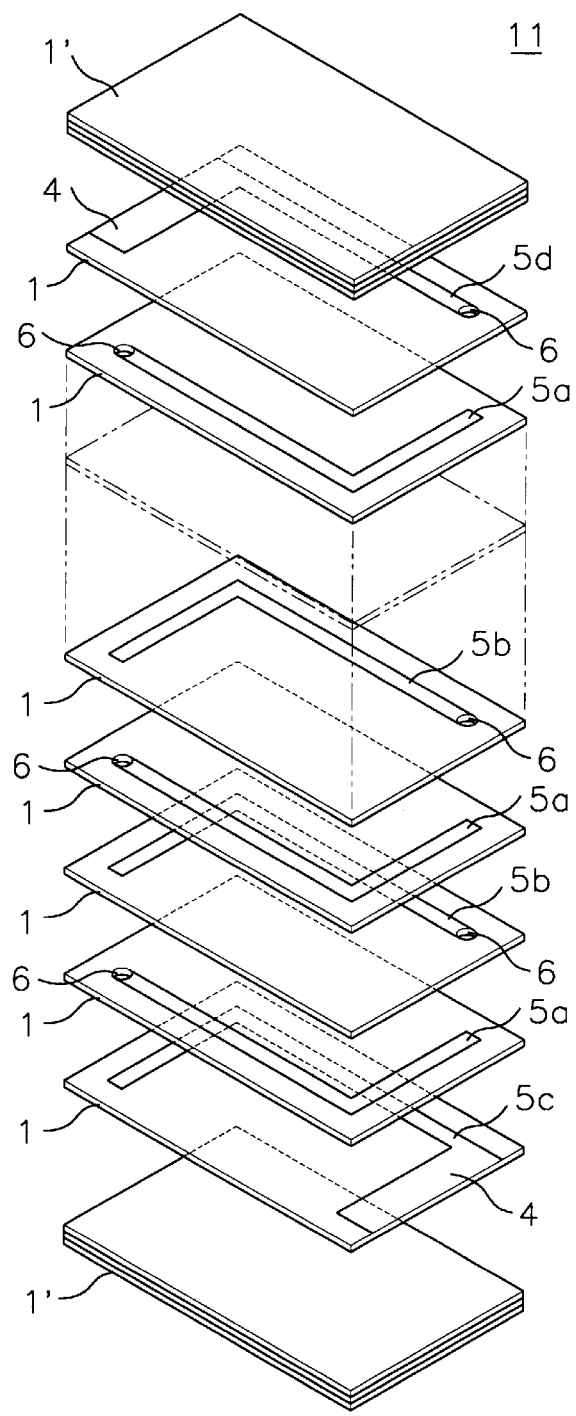
FIG. 14 shows an exploded perspective view of a laminated structure of a conventional multilayer type ceramic inductor.

The sixth embodiment shown in FIG. 13 is similar to the fourth embodiment shown in FIG. 9 in that the pair of external electrodes 14, 14 are formed on top and bottom of the stacked ceramic layers 1, 1 . . . , 1', 1' . . . , 1", 1" . . . (see FIG. 10), but is different from the fourth embodiment in that each of the ceramic layers 1", 1" . . . is interposed between every two ceramic layers 1, 1 having the internal electrode patterns 5a, 5b, each of which has a half turn of the coil.

In the multilayer type ceramic inductor in accordance with the sixth embodiment, as a result of one single ceramic layer 1" without the internal electrode pattern being interposed between every two internal electrode patterns 5a, 5b, each of which has a half turn of the coil, the capacitance between the successive ceramic layers having the internal electrode patterns can be lowered. Consequently, it is possible to obtain the multilayer type inductor having a relatively small stray capacity.

In this embodiment, when the total number of turns required in the coil formed by the internal electrode patterns 5a–5d decreases, this is compensated by increasing the number of ceramic layers 1" interposed between the ceramic layers 1, 1 to manufacture the multilayer type electronic part within the preset dimension. Further, similar to the fifth embodiment shown in FIG. 12, the through-holes 6' are formed on the predetermined location of each of the thin ceramic sheets 9 and the plurality of ceramic layers 9 may be stacked on top of each other so as to form the single layer functioning as the ceramic layer 1".

In the foregoing multilayer type electronic part, the ceramic layers 1', 1' . . . having the through-holes filled with the conductive material are provided on top and bottom of the stack of the ceramic layers 1, 1 . . . having the internal electrode patterns 5a, 5b and the ceramic layers 1" having the through-holes 6' filled with the conductive material are, respectively, interposed between ceramic layers 1, 1 . . . having the internal electrode patterns 5a–5d. As a result of this, it is possible to reduce the stacked number of the ceramic layers 1' having the through-holes 6" only stacked on top and bottom of the ceramic layers 1, 1 having the internal electrode patterns 5a, 5b, thereby preventing the concentration of the conductive material at the vicinity of the external electrodes 14, 14. As a result, the resistance of the laminated structure 11 is reduced.

Further, Although the above discussions have been presented referring to a situation where the silver powder is employed as the conductive material of the conductive paste, it is possible to employ copper, nickel, palladium or alloy thereof etc. as the conductive material of the conductive paste.

Further, Although the above discussions have been presented referring to a situation where the multilayer type electronic part is manufactured using the dry stacking method, it may be manufactured using the wet stacking method. Only difference therebetween is in obtaining the laminated structure composed of the ceramic layers prior to sintering by stacking the preformed ceramic green sheets or by stacking and applying the ceramic paste. In addition, in the wet stacking method, the internal electrode patterns are not connected to each other through the through-holes filled with the conductive material. They get connected to each other while successively applying ceramic paste on the internal electrode patterns except for ends to be used in connecting with its neighboring patterns. Other than the discussions described above, there no difference therebetween.

Further, it should be noted the step of sintering the laminated structure 11 and the step of forming the external electrodes using the heat may be carried out simultaneously. To be more specific, after applying the conductive paste in such a way that the external electrodes are formed at the sides of the laminated structure prior to sintering, the step of sintering the laminated structure 11 and the step of sticking the external electrodes using the heat may be carried out simultaneously. In this case, it is necessary to use the conductive paste which can be sintered at a high temperature.

As described above, the present invention makes it possible to manufacture the multilayer type electronic parts having different inductance values from each other using the ceramic green sheets having an identical thickness. Further, the present invention makes it possible to manufacture the multilayer type electronic part having relatively small number of turns and hence small inductance value without increasing the stray capacity. These factors will allow the production efficiency to increase and the performance characteristics of the multilayer type electronic part to improve by preventing the inductance value from increasing due to the stray capacity.

While the present invention has been described with respect to certain preferred embodiments only, other modifications and variations may be made without departing from the scope of the present invention as set forth in the following claims.

What is claimed is:

1. A multilayer type electronic part including a laminated structure and a pair of external electrodes, the laminated structure being formed by stacking a plurality of first ceramic layers and two sets of one or more second ceramic layers, the first ceramic layers being provided with internal electrode patterns on top thereof, the second ceramic layers having no internal electrode pattern and the two sets of second ceramic layers being located at a top and a bottom portions of the laminated structure, respectively, the internal electrode patterns being connected to each other to form a coil inside the laminated structure, the laminated structure having a set of a top and a bottom surfaces opposing each other and a set of two opposing side surfaces, the top and the bottom surfaces corresponding to the outermost surfaces of the second ceramic layers, and the pair of external electrodes being provided at the two opposing surfaces of one of the two sets and connected to the coil, the multilayer type electronic part further comprising:

one or more third ceramic layers, the third ceramic layers not including internal electrode pattern and being interposed between the first ceramic layers; and means for connecting the internal electrode patterns formed on the first ceramic layers to form the coil.

2. A multilayer type electronic part including a laminated structure and a pair of external electrodes, the laminated structure being formed by stacking a plurality of first ceramic layers and two sets of one or more second ceramic layers, the first ceramic layers being provided with internal electrode patterns on top thereof, the second ceramic layers having no internal electrode pattern and the two sets of second ceramic layers being located at a top and a bottom portions of the laminated structure, respectively, the internal electrode patterns being connected to each other to form a coil inside the laminated structure, the laminated structure having a set of a top and a bottom surfaces opposing each other and a set of two opposing side surfaces, the top and the bottom surfaces corresponding to the outermost surfaces of the second ceramic layers, and the pair of external electrodes being provided at the two opposing surfaces of one of the two sets and connected to the coil, the multilayer type electronic part further comprising:

one or more third ceramic layers, the third ceramic layers not including internal electrode pattern and being interposed between the first ceramic layers; and a through-hole formed on each of the third ceramic layers and filled with a conductive material to connect the internal electrode patterns formed on the first ceramic layers to form the coil.

3. The multilayer type electronic part of claim 2, wherein each of the third ceramic layers is formed by stacking a plurality of ceramic sheets.

4. The multilayer type electronic part of claim 3, wherein the ceramic sheets constituting each of the third ceramic layers are provided with through-holes at their predetermined locations.

5. The multilayer type electronic part of claim 4, wherein the through-holes of the ceramic sheets are formed by using a laser beam.

6. The multilayer type electronic part of any one of claims 1 to 5, wherein at least one third ceramic layer is interposed between every two neighboring sets of first ceramic layers, internal electrode patterns of each set of first ceramic layers forming one turn of the coil.

7. The multilayer type electronic part of any one of claims 1 to 5, wherein at least one third ceramic layer is interposed between every two neighboring sets of the first ceramic layers, internal electrode patterns of each set of first ceramic layers forming a half turn of the coil.

8. The multilayer type electronic part of any one of claims 1 to 5, wherein the external electrodes are provided on the top and the bottom surfaces of the laminated structure.

9. The multilayer type electronic part of any one of claims 1 to 5, wherein the two opposing side surfaces are substantially normal to the top and the bottom surfaces and the external electrodes are provided on the two opposing side surfaces.

10. The multilayer type electronic part of claim 6, wherein the external electrodes are provided on the top and the bottom surfaces of the laminated structure.

11. The multilayer type electronic part of claim 6, wherein the two opposing side surfaces are substantially normal to the top and the bottom surfaces and the external electrodes are provided on the two opposing side surfaces.

12. The multilayer type electronic part of claim 7, wherein the external electrodes are provided on the top and the bottom surfaces of the laminated structure.

13. The multilayer type electronic part of claim 7, wherein the two opposing side surfaces are substantially normal to the top and the bottom surfaces and the external electrodes are provided on the two opposing side surfaces.

* * * * *